United States Patent
Baum et al.

(10) Patent No.: US 7,761,922 B1
(45) Date of Patent: Jul. 20, 2010

(54) METHODS AND APPARATUS FOR CONTEMPORANEOUSLY ACQUIRING AND CERTIFYING CONTENT

(75) Inventors: Daniel R. Baum, Menlo Park, CA (US); Kenneth E. Feuerman, Fremont, CA (US)

(73) Assignee: Adobe Systems Inc., San Jose, CA (US)

(*) Notice: Subject to any disclaimer, the term of this patent is extended or adjusted under 35 U.S.C. 154(b) by 1544 days.

(21) Appl. No.: 11/068,014

(22) Filed: Feb. 28, 2005

(51) Int. Cl.
*G06F 7/04* (2006.01)

(52) U.S. Cl. .......................................... 726/26; 726/27
(58) Field of Classification Search .................. None
See application file for complete search history.

(56) References Cited

U.S. PATENT DOCUMENTS

| 7,549,172 B2* | 6/2009 | Tokutani et al. ............... 726/27 |
| 2004/0005060 A1* | 1/2004 | Choi et al. .................. 380/280 |
| 2005/0160260 A1* | 7/2005 | Yasuda ...................... 713/157 |

FOREIGN PATENT DOCUMENTS

WO    WO 02/077831    * 10/2002

* cited by examiner

*Primary Examiner*—Nasser Moazzami
*Assistant Examiner*—Carlton V Johnson
(74) *Attorney, Agent, or Firm*—Chapin IP Law, LLC (57) ABSTRACT

A system produces certified content by receiving original content acquired from a content acquisition device and receiving a device identity associated with the content acquisition device. The system produces a certification value indicating the original content was acquired from the content acquisition device having the device identity. The system associates the certification value to the original content to produce certified content that can be verified to represent the original content that was acquired from a content acquisition device having the associated device identity while preventing modification to the original content by processing not associated with certification processing. This process is performed in an uninterrupted manner to ensure certified content reflects an accurate device identity. The system can be implemented entirely within a content acquisition device itself, or in a computer system coupled to a content acquisition device.

29 Claims, 6 Drawing Sheets

METHODS AND APPARATUS FOR CONTEMPORANEOUSLY ACQUIRING AND CERTIFYING CONTENT

BACKGROUND

Conventional computer systems provide the ability to operate peripheral content acquisition devices such as scanners or digital camera devices or such devices that can capture or acquire digital content or data such as a scanned document or digital photograph from a physical source. Once acquired, a computer system can visually render this content for a user or can transmit the content to remote recipients. In the operation of such conventional equipment and software, the user controls the computer system to instruct the connected content acquisition device to acquire data from a physical source, and software such as a device driver that communicates with the peripheral device (e.g., the scanner or camera device) is capable of receiving digital content from the device and storing it within a file in the computer system. The user of the computer system can then use a variety of different software applications to access the file containing the content acquired from the content acquisition device for many different purposes.

In some instances, a user of conventional systems such as those explained above may desire the ability to secure or "certify" the digital content within the file. This may include applying, for example, a digital signature or hash algorithm to the content of the file so that if the user, for example, transfers the file to a remote recipient, the remote recipient can access the digital signature associated with the file to determine whether the digital content within the file is authentic (i.e., is the content in the file upon which the digital signature was calculated). This conventional content authentication or certification verification process typically operates by computing a signature value on the content contained within the file and comparing that signature to the signature received along with the file. If the two signatures are the same, then the content is certified and the recipient can be sure the content has not been modified since the time the signature received with the content was generated on the content.

Several conventional software applications provide the ability to access a file of digital content stored within the computer system, such as a file in a file system containing scanned content, and to produce a signature or other certification on the digital content of the file. Once the signature is produced, the software application then associates that signature with the original file in order to create certified content in either a new file or in a file that replaces the original file. One example of a conventional application that provides this capability is Adobe Acrobat manufactured by Adobe Systems, Inc. of San Jose, Calif., U.S.A. Conventional versions of Adobe Acrobat allow a user to access a file of content stored on disk to produce a portable document format (PDF) version of that content that is certified with user supplied certification data.

By way of example, in order to certify scanned content received by the computer system from a scanner device coupled to the computer system, a user of a conventional computer system would operate scanner software in order to scan the original document content from the scanner device into a file located within a file system accessible to the computer system. The user can then operate the scanner software to print the acquired content, that is now stored within the file in a scanner data format, such as a raster image, on the disk in the computer system into another file stored in PDF format. The user is able to instruct the Adobe Acrobat software application to produce a certified version of the PDF file from the uncertified version of the raster image file. To do so, the user manually provides some certification data, such as an identity of the user or the computer system or the scanner device that acquired the file and based on this input from the user, Adobe Acrobat produces a certified copy of the content within a PDF file. User input may not be required, in which case Acrobat applied a standard signature algorithm to the raster data in the file obtain from the file system.

Thereafter, if the same or a different user (maybe on a different computer system) opens the certified PDF file using Adobe Acrobat, Acrobat will automatically recognize the file as containing certified content and will perform a certification function that checks the signature to determine if any modifications have been made to the certified content within the PDF file since the time the original certification was performed. If such modifications exist, the user attempting to open the content will be notified that the certification process failed and that the content that they are attempting to open and view may have been modified from its form that existed in the file just prior to the certification process.

SUMMARY

Conventional mechanisms and techniques for creation of certified content suffer from a variety of deficiencies. In particular, using conventional systems, the process of acquiring original content such as scanned document data or digital photograph data from a peripheral data acquisition device places such acquired data or content into a file within the file system of the computer system. This process of acquiring the original content is separate or disjoint from the process of producing a certified copy of this content. Using the above example, the operator is required to operate scanner software to acquire the original content from the scanner device into a file within the computer system. At some time thereafter, the user is then required to operate the Adobe Acrobat application to access the original uncertified content to produce a certified version of the content. Due to the multistep nature of this process and the fact that human intervention is required to trigger each of these steps, there is a period of time during which the original content is obtained from the content acquisition device and resides within the computer system in an uncertified form in the file system. Prior to the certification process being completed, this original content may be subject to malicious or unintended modifications from its original form, thus compromising the integrity of the original content as acquired from the content acquisition device (e.g., the scanner in this example). As a result, a certification process performed on content that has been modified from its true original form does not accomplish an intended goal of ensuring that the certified content has not been modified from its original acquired form. Stated differently, conventional techniques for producing certified content are susceptible to malicious attacks since there is a disconnect between the process of acquiring the content from the peripheral device and the later certification process that produces a certified version of this content.

Moreover, conventional certification processes may rely strictly upon operator input to obtain a certification value to the associated with the certified content. As an example, using conventional certification mechanisms, if an operator desires to produce certified content in an attempt to ensure that the content is the same original content captured by a specific peripheral device such as a scanner coupled to a specific computer system, the conventional certification process can prompt the operator to input the data identifying the computer system and/or the peripheral device used to acquire the original content. This can be useful in applications requiring security, such as in financial, government or homeland security applications. It is up to the operator to correctly identify the appropriate device(s) from which the content was formerly acquired and the certification process will use this information in a signature production algorithm to produce certified content. Such conventional systems allow for operator error, intended or otherwise, and thus can result in production of certified content that erroneously identifies the computer system or peripheral device or user that was actually involved in capturing the original content.

Accordingly, embodiments disclosed herein are based in part on the observation that there is a need to provide a system that merges the content acquisition process and the certification process into a single contemporaneous processing operation embodied within a single mechanism to avoid the possibility of intervention by a user/operator or a malicious process between the time of acquiring original content by the content acquisition device and the time of producing a certified version of this original content within the computer system.

To this end, embodiments of the invention provide a mechanism for a content acquisition device such as a scanner or camera or other such device to acquire original content from a physical source, such as an image on a paper document or a picture of an object, and to supply this original content to a content certifier configured according to embodiments disclosed herein. The content certifier, in addition to receiving the original content, further automatically receives an identity of the content acquisition device, such as an identity of the scanner in the former example that was used to acquire and transmit or otherwise provide the original content to the content certifier. Thus a content certifier configured according to embodiments disclosed herein can automatically, without operator intervention, obtain the identity of the device associated with the content acquisition process and can use this information during the certification process which is performed in a manner that is contemporaneous with receipt of the original content and receipt of the content acquisition device identity such that the certification process performs a non-operator interruptible sequence of processing of both acquiring the original content and certifying the original content. In this manner, embodiments disclosed herein eliminate the ability for an operator or a malicious process unrelated to the content certification operation to access to the original content during the time of original content acquisition and certification of the original content. As a specific example, using the system disclosed herein, paper documents can be scanned and distributed or archived electronically and the content of the document can be certified to be authentic from the point of scanning.

More specifically, embodiments disclosed herein provide mechanisms and techniques generally referred to herein as a content certifier that produces certified content by receiving original content acquired from a content acquisition device such as a scanner, digital camera device or other such device. In addition, the content certifier receives a device identity associated with the content acquisition device. In one configuration, the device identity is received in a manner that is contemporaneous with the receipt of the original content. By contemporaneous, what is meant is that the device identity is received either before, after or during receipt of the original content (e.g., the device identity is multiplexed with the original content or is embedded therein), and that both of such operations (acquiring the original content and device identity and performing the certification process) are performed by the same content certifier processing entity (e.g., software process) to avoid the ability for an operator or another unrelated process to have intermediate access to the original content and/or the obtained device identity prior to the certification processing being completed.

As an example, in one configuration the device identity is embedded within the content acquisition device and the content certifier is able to operate a communications interface to the content acquisition device to cause the content acquisition device to obtain the original content and transmit the original content as well as the device identity for receipt by the content certifier. Using the original content and the device identity, the content certifier produces a certification value indicating the original content was acquired from the content acquisition device having the device identity and associates this certification value to the original content while preventing modification to the original content by processing not associated with the operations of receiving the original content, receiving the device identity, producing the certification value and associating the certification value to the original content. This can include applying a certification function using the original content and the received device identity to produce a certification value that is assured to be based on an original data format of the original content.

In this manner, since operations of the steps are contemporaneous with each other, there is little or no chance of an insecure situation in which the original content is modified from its original form either by a user process or a system process. The content certifier associates the certification value to the original content to produce certified content that can be verified to represent the original content that was acquired from a content acquisition device having the associated device identity. This can include combining or associating the certification value with the original content while concurrently preventing access, by an operator and by unauthorized processes, to the original content during performance of the operations of receiving original content, receiving a device identity, producing a certification value, and associating the certification value to the original content to ensure that the certification value reflects actual untampered-with original content and the device identity of the content acquisition device that provided or acquired the original content from a physical source, such as by scanning or digitally imaging (i.e., photographing) an object.

In one configuration, the content certifier obtains the device identity from the content acquisition device at the same time as obtaining the original content from the content acquisition device. The device identity in this configuration is encoded within a data format of the original content that is received over the communications interface.

In another configuration, the content acquisition device is a scanner device coupled to a computer system. The scanner device is capable of scanning the original content and returning the original content to the computer system. The computer system performs a content certifier application that performs the operations of receiving original content from the scanner device, receiving a device identity from the scanner device, producing a certification value, and associating the certification value to the original content received from the scanner device while concurrently preventing access, by an operator of the content acquisition device and by an operator of the computer system and by unauthorized processes executing on the computer system, to the original content within the computer system from the time the original content was received from the scanner device until the original content is converted to certified content.

Still other configurations provide a content certifier that receives individual portions of the original content over time.

Each individual portion is smaller than a sum total of the original content. In such configurations, each individual portion of the original content, once received, is respectively individually processed by an iteration of the operations of producing a certification value and associating the certification value to the original content such that a respective portion of certified content is produced for each individual respective portion of original content. Further details of such embodiments will be explained shortly.

Other embodiments of the invention include any type of computerized device, workstation, handheld or laptop computer, or the like configured with software and/or circuitry (e.g., a processor) to process any or all of the method operations disclosed herein. In other words, a computerized device or a processor that is programmed or configured to operate as explained herein is considered an embodiment of the invention.

Other embodiments of the invention that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor and a display, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein. The content certifier can be embedded as part of an operating system, a device driver, as firmware in a computer, or as part of a software application (e.g., scanner or camera software).

It is to be understood that the system of the invention can be embodied strictly as a software program, as software and hardware, or as hardware alone such as within a processor, or within an operating system or a within a software application.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
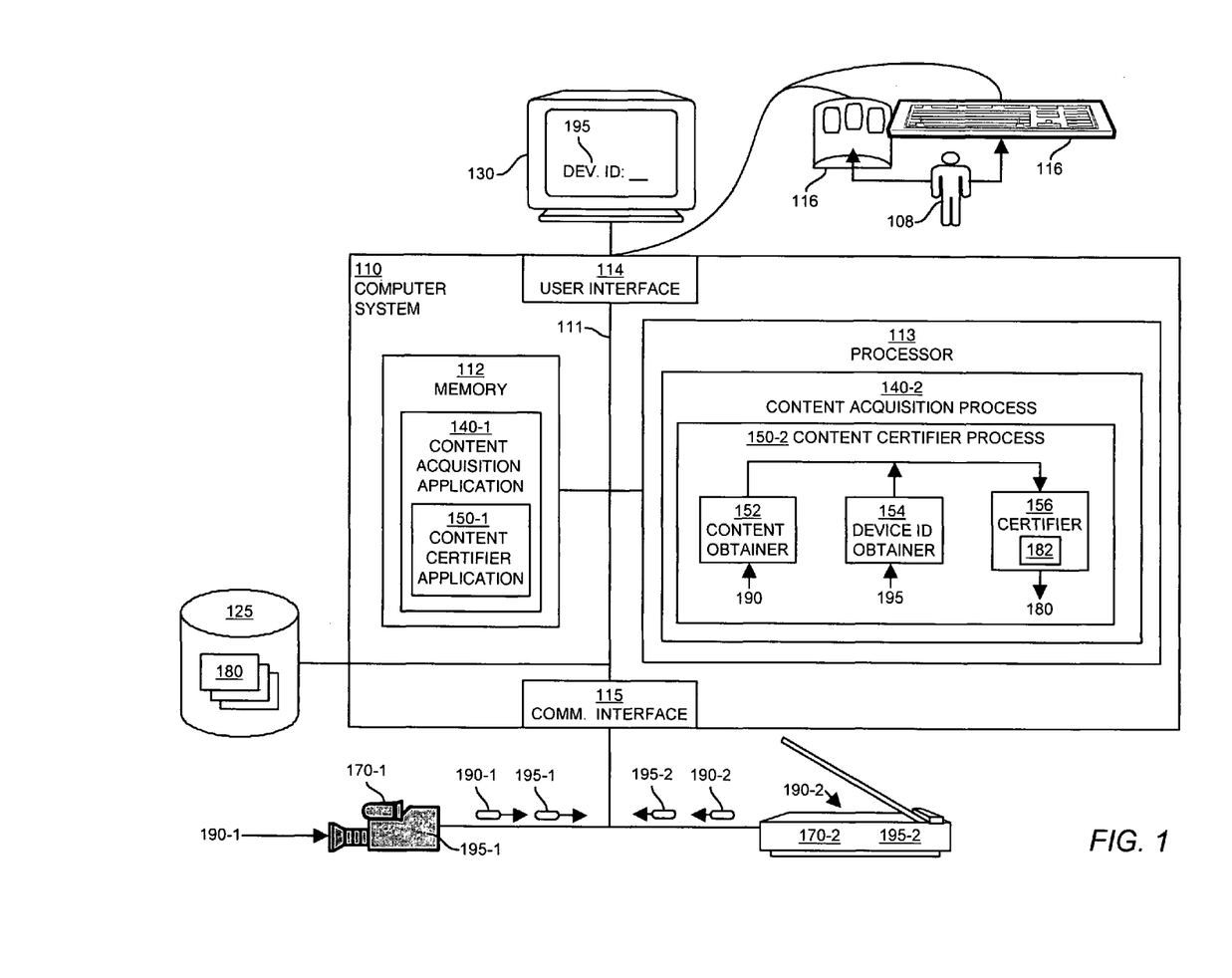
FIG. 1 is a block diagram of a computer system configured with a content certifier configured in accordance with one example embodiment of the invention.

FIG. 1 is a block diagram illustrating an example architecture of a computer system 110 that executes, runs, interprets, operates or otherwise performs, in this example, a content acquisition application 140-1 and process 140-2 that include, respectively, a content certifier application 150-1 and content certifier process 150-2 that operate according to configurations disclosed herein. The computer system 110 may be any type of computerized device such as a personal computer, workstation, portable computing device, console, laptop, dedicated device, network terminal or the like. As shown in this example, the computer system 110 includes an interconnection mechanism 111 such as a data bus or other circuitry that couples a memory system 112, a processor 113, a user interface 114, and a communications interface 115. One or more user input devices 116 (e.g., one or more user controlled devices such as a keyboard, mouse, etc.) couple to processor 113 through user interface 114 and enable a user 108 to provide input commands and generally control the computer system 110 through interaction with a display 130 that can present, for example, a graphical user interface for viewing by the user 108. The communications interface 115 enables the computer system 110 to communicate with other devices such as peripheral content acquisition devices 170-1 and 170-2. The peripheral content acquisition device 170-1 is a digital camera device in this example, while the peripheral content acquisition device 170-2 is a scanner device. The content acquisition devices 170 are able to acquire digital content from a physical source, such as by scanning a document or taking a digital photograph. This digitally acquired content is referred to herein as original content 170. The computer system further includes a database 125 that may be, for example, a file system that stores certified content 180 produced in accordance with embodiments disclosure herein.

The memory system 112 is any type of computer readable medium and in this example is encoded with a content acquisition application 140-1 that includes a content certifier application 150-1 (that may be a sub-routine of application 140-1) each of which may be embodied as software code such as data and/or logic instructions (e.g., code stored in the memory or on another computer readable medium such as a removable disk) that supports processing functionality disclosed herein to produce certified content.

During operation of the computer system 110, the processor 113 accesses the memory system 112 via the interconnection mechanism 111 in order to launch, run, execute, interpret or otherwise perform the logic instructions of the content acquisition application 140-1. Execution of content acquisition application 140-1 in this manner produces processing functionality in a corresponding content acquisition process 140-2. In other words, the content acquisition process 140-2 represents one or more runtime instances of the content acquisition application 140-1 that are performing or executing within or upon the processor 113 in the computerized device 110. In this example, the content certifier application 150-1 is a part of the content acquisition application 140-1 (e.g., is a subroutine, thread, sub-process or other related logic) that, when executed by the processor 113, provides a corresponding content certifier process 150-2 operating as explained herein.

In the illustrated example, the content acquisition application 140-1 and process 140-2 may be any type of scanner or camera control software that operates in the computer system 110 to cause the camera or scanner content acquisition devices 170 to acquire original content 190 such as a digital photograph or scanned document image obtain from scanning a paper document (i.e., from a physical source to provides the content in one medium that is then converted to data). It used to be understood that the content acquisition device 170 may be any type of device that can acquire original content 190 from any physical source and that the content acquisition application and process 140 represents software to control such a content acquisition device 170. In this example configuration, the content certifier process 150-2 includes a content obtainer 152, a device identification obtainer 154 and a certifier 156 (that produces the certification value 182) and the processing of these components of the content certifier 150 will be explained in reference to the overall operation of configurations disclosed herein.

Generally, during operation, the content certifier process 150-2 operates within the content acquisition process 140-2 to cause the content obtainer 152 to acquire original content 190 from a content acquisition device 170 such as the camera 170-1 or the scanner 170-2. The original content 190 is any type of digital content that represents physical content or an image that the content acquisition device 170 acquires from a physical source. The content certifier 150 further obtains the device identity 195 associated with the content acquisition device 170 that acquired the original content 190, such as by querying the device 170 for its embedded identity 195. Using this information, the content certifier 150 produces a certification value 182 and associates this to the original content 190 to produce certified content 180. Further details of this processing will now be explained with respect to a flowchart of processing steps shown in FIG. 2.

Figure 2:
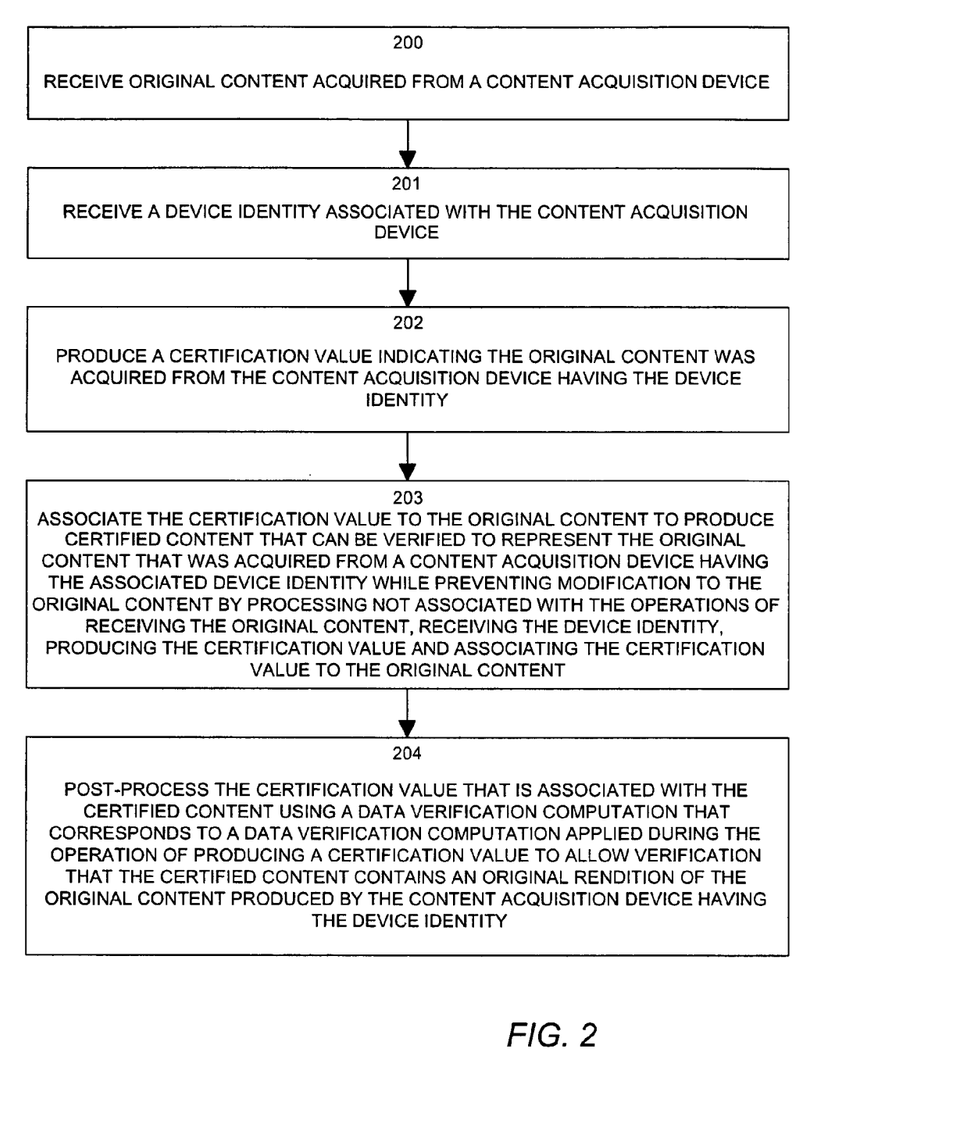
FIG. 2 is a flow chart of processing steps that shows high-level processing operations performed in accordance with a content certifier in accordance with one example configuration of the invention.

FIG. 2 is a flowchart of processing steps performed in accordance with configurations of a content certifier 150 to produce certified content 180. Generally, unless otherwise stated, the content certifier 150 performs the operations and processing steps shown in the flowcharts disclosed herein.

In step 200, the content certifier 150 receives original content 190 that it acquires from a content acquisition device 170. This process can be initiated by the user 108 who launches, runs, executes or otherwise performs operation of the content acquisition application 140-1 which creates a runtime instance of the content acquisition process 140-2 within which the content certifier process 150-2 executes (e.g., as a software thread or related process). In the example illustrated in FIG. 1, the content obtainer 152 performs the processing associated with acquiring the original content 190. The original content 190 represents any type of digital data that the content acquisition device 170 obtains from inspecting a physical source, such as by taking a digital photograph of an object or by scanning content from a physical document using a scanner device 170-2.

In step 201, the content certifier 150 receives a device identity associated with the content acquisition device. In one configuration, the content certifier 150 performs the processing of step 201 contemporaneously with the operation of step 200. In particular, the device identification obtainer 154 obtains a device identity 195 associated with the content acquisition device 170 that acquired the original content 190. Depending on the configuration, the device identity 195 can be either embedded within the actual content acquisition device 170, in which case a device communications protocol is performed to query or otherwise obtain the device identity 195 from the content acquisition device 170, or alternatively, the device identity can be obtained from a combination of other sources such as from a device identity code embedded within the computer system 110 coupled to the peripheral device 170 along with some identification information obtained from the user 108, who may enter some component of the device identity 195 into a graphical user interface of the display 130. In other words, in one configuration, some part of the device identity 195 can be obtained from the user to indicate, for example, a location of the device 170 that has meaning to that person or organization (e.g., user name, department owing the device 170, floor or room number device is located, etc.). In another alternative configuration as will be explained further, the device identity 195 can be fully pre-encoded within the computer system 110. In configurations described herein that allow the user to enter some component of the device identity 195, the user is not permitted access to the acquired content which is being certified from the time the device 170 acquires the content to the time the content is certified with the device identity 195. This can be accomplished, for example, by maintaining the content to be certified in a protected memory location. In this manner, the process of certification is a continuous uninterrupted and secure process that does not allow user access to the content being certified.

It is to be understood that a combination of information from different sources can serve as the device identity, and thus device identity as used here is not limited to simply identifying the device, but can include any other type of identification information as well, though it does not have to. For example, if the device identity is provided in part from the user or is embedded within the computer system, the device identity can include an actual identity of the device 170, such as a hardware serial number, MAC address, or other such data, and can also include related identity data such as an identity of the computer system (e.g., hostname) and/or the user (e.g., username) that is operating the data acquisition device 170, a time and date information, and so forth. Preferably, the device identity 195 should include an actual identification of the device 170 that is not prone or susceptible to change and thus a query to the device 170 itself can obtain, for example, the manufacturers name in conjunction with a manufacturers encoded serial number that when combine are largely assured to be unique for all devices of that type (e.g., all scanners would have a unique device identity).

In step 202, the content certifier 150 operates the certifier 156 to produce a certification value 182 indicating the original content 190 was acquired from the content acquisition device 170 having the device identity 195. In one configuration, the certifier 156 performs this processing without interruption between steps 200, 201 and 202 and can apply any type of digital signature algorithm, hashing algorithm or other digital fingerprinting technique that combines the device identity 195 and the original content 190 acquired from the device 170 having the device identity 195 in an inseparable manner.

In step 203, the content certifier 150 (i.e., certifier 156) associates the certification value 182 to the original content 190 to produce certified content 180 that can be verified to represent the original content 190 that was acquired from a content acquisition device 170 having the associated device identity 195 while preventing modification to the original content by processing not associated with the operations of receiving the original content (step 200), receiving the device identity (step 201), producing the certification value (step 202) and associating the certification value to the original content (step 203). Thus processes in the computer system 110 or device 170 not associated with the aforementioned processing are not provided with access to the original content before it is certified. Accordingly, once the content certifier 150 produces the certified content 180, changes made to the certified content 180 can be detected by performing a reverse certification algorithm on the original content 180 as will be explained. Since the content certifier 150 is embedded within the content acquisition application or process 140 (or is in an operating system, device driver, or other such program), the content certifier 150 is able to combine the certification value 182 with the original content 190 while concurrently preventing access, by an operator 108 and/or by any unauthorized processes to the original content 190 from the time it is acquired from the device 170 to the time it is converted the certified content 180. Once the content certifier 150 has produced the certified content 180, the content certifier 150 can store the certified content 180 within a database or file system 125 as illustrated in FIG. 1. Thereafter, any process that accesses the certified content 180 can verify its integrity to determine whether or not the certified content 180 represents a rendition of the original content 190 and original or unaltered form.

This is illustrated in step 204, in which any application or process can post-process the certification value 182 that is associated with the certified content 180 (e.g., that is embedded as a digital signature therein) using a data verification computation that corresponds to a data verification computation applied during the operation of producing a certification value 182 to allow verification that the certified content 180 contains an original rendition of the original content 190 produced by the content acquisition device 170 having the device identity 195. Accordingly, the direct output of a data acquisition operation of obtaining original content 190 using such configurations is a certified version of the content 180 that is less susceptible to tampering due to the contemporaneous and uninterrupted nature of the processes of acquiring the original content 190 and the device identity 195, and performing a certification operation of that content 190 to produce certified content 180 while disabling operator or other process intervention during this processing.

It is to be understood that the processing described above can be implemented within any type of computerized device, including entirely within the content acquisition device 170 itself. In other words, configurations explained herein described techniques and mechanisms for producing certified content, and are not restricted or limited to being implemented in a computer system that acquires content from a connected separate peripheral content acquisition device 170. Thus in an alternate configuration, the processing operations explained herein can be implemented within a certification processor that operates in the device 170 itself, in which case the certification processor in the device 170 would receive the acquired content (step 200) via the device's mechanism for doing content acquisition (e.g. scanning or photo capture mechanism) and would receive the device identify 195 from an embedded location (e.g., firmware) within the device 170. Thereafter, the embedded certification processor can perform the remain steps explained above (and below in more detail) to produce and output certified content 190 directly to the computer system 110. In this manner, computerized devices operating according to configurations explained herein can include any type of data acquisition device.

Further details of the aforementioned processing steps will be explained with respect to a more detailed flowchart discloses that shown alternative configurations of embodiment of the invention.

FIGS. 3 through 6 are a single flow chart of processing steps performed in accordance with configurations disclosed herein to produce certified content.

Figure 3:
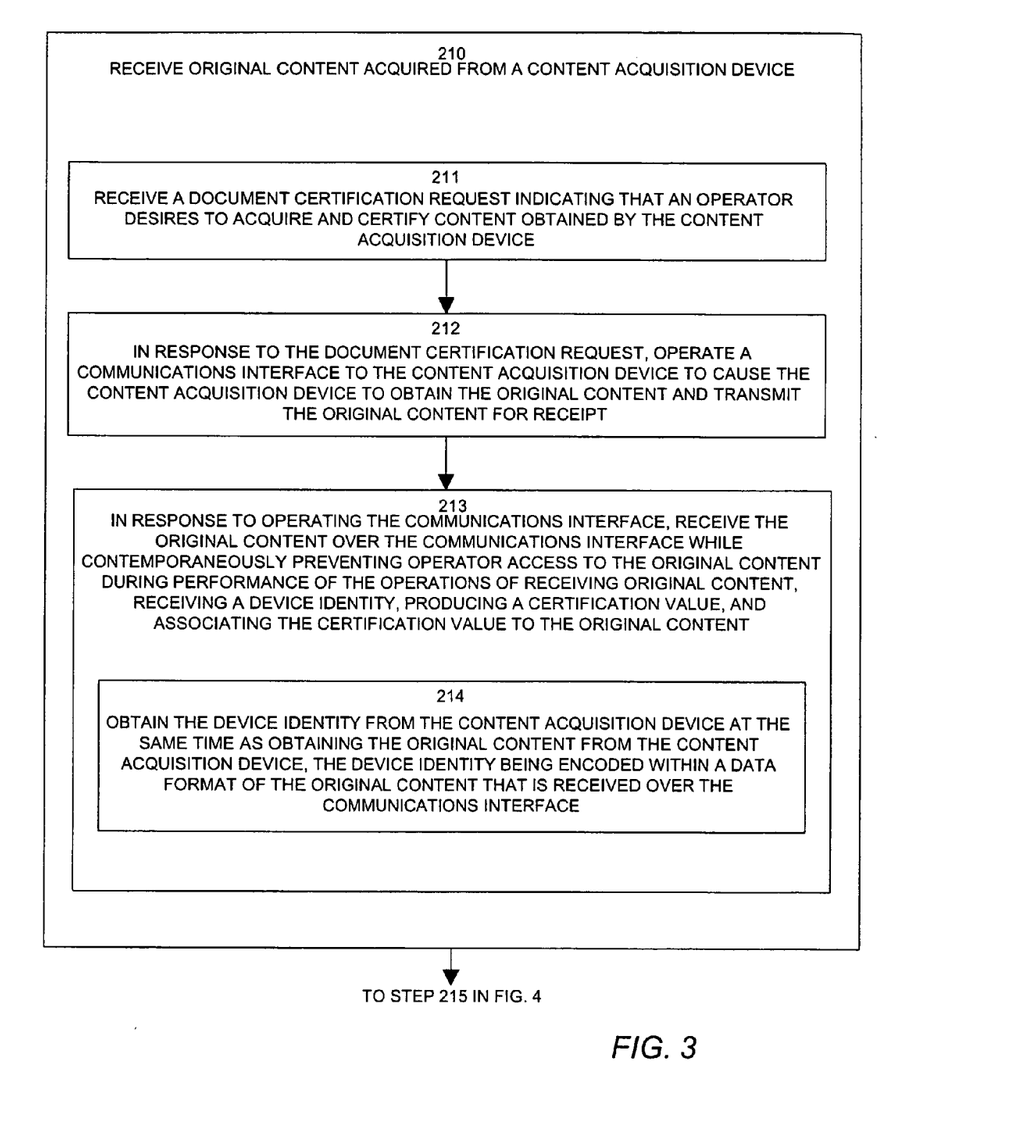
FIGS. 3 through 6 are a flow chart of processing steps that show details of processing operations to provide certified content in accordance with example configurations of the invention.

In step 210, the content certifier 150 receives original content 190 acquired from a content acquisition device 170. Sub-steps 211 through 214 illustrate details of processing according to various configurations to receive the original document content 190.

In step 211, the content certifier 150 receives a document certification request indicating that an operator 108 desires to acquire and certify content to be obtained by the content acquisition device 170. The document certification request can be the operator 108 executing the content acquisition process 140-2 to control the content acquisition device 170 in order to obtain original content 190 from a physical source.

In step 212, the content certifier 150, in response to the document certification request, operates a communications interface 115 to the content acquisition device 170 to cause the content acquisition device 170 to obtain (e.g., scan or photograph) the original content 190 from its physical source and transmit the original content 190 for receipt (e.g., by the content obtainer 152).

In step 213, the content certifier 150, in response to operating the communications interface 115, receives the original content 190 over the communications interface 115 while contemporaneously preventing operator access to the original content 190 (i.e., to the electronically obtained version) during performance of the operations of receiving original content, receiving a device identity, producing a certification value, and associating the certification value to the original content.

In sub-step 214, in one configuration the content certifier 150 obtains the device identity 195 from the content acquisition device 170 at the same time as obtaining the original content 190 from the content acquisition device 170. As an example, the device identity 195 may be encoded within a data format of the original content 190 that is received over the communications interface 115.

Figure 4:
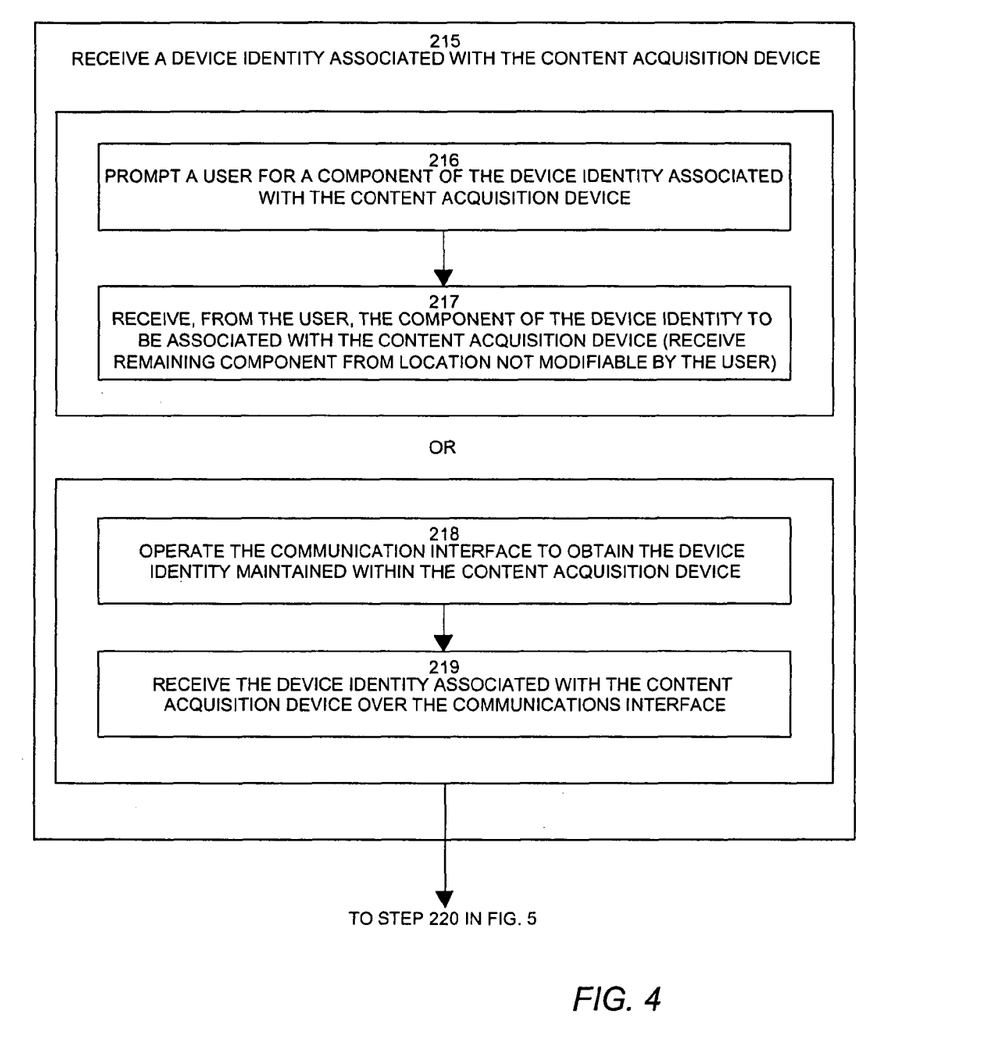

After the processing steps in FIG. 3 are complete processing continues at step 215 in FIG. 4.

FIG. 4 is a continuation of the flowchart of processing steps in FIG. 3 and shows further details of processing according to configurations disclosed herein.

In step 215, the content certifier 150 receives a device identity 195 associated with the content acquisition device 170. According to configuration disclosed herein, there are alternative mechanisms for receiving the device identity 195 as shown by sub-steps 216 through 219. In one optional configuration as illustrated in step 216 and 217, the device identity is obtained, in part, from the user, whereas in an alternative configuration as shown in steps 218 and 219, the content certifier 150 obtains the device identity 195 from the device 170 itself.

In step 216, the content certifier 150 prompts a user for a portion of a device identity 195 to be associated with the content acquisition device. This is illustrated in FIG. 1 in which the display 130 prompts the user for a component of the device identity 195 during operation of the processing disclosed herein.

In step 217, the content certifier 150 receives, from the user 108, the component of the device identity 195 to be associated with the content acquisition device 170. Note that this configuration can be used in conjunction with configuration shown in steps 218 and 219 below in order to allow the user 108 to supply some user specific information concerning the content acquisition device 170 that is used to acquire the original content 190. As an example, the computer system 110 may be configured more than one of the same type of data acquisition device 170 attached to communications interface 115, such as two or more scanners attached to computer 110. In such cases, a user 108 can supply some device identity information 195 via the display 130 indicating which particular scanner is used to acquire the original content 190. As an example, the user may enter the vendor name of manufacturer of the particular scanner 170 or may enter an identity of the communications port to which a particular scanner or other device is connected or a physical location of the device 170. The content certifier 150 receives a remaining component of the device identity 195 from a location not accessible to the user, such as from the device itself as previously explained, or from a location embedded within the computer system 110.

Steps 218 and 219 illustrate an alternative configuration in which obtaining the device identity 195 is fully automated.

In step 218, the content certifier 150 operates the communication interface 115 to obtain the device identity 195 maintained within the content acquisition device 170.

In step 219, the content certifier 150 receives the device identity 195 associated with the content acquisition device 170 over the communications interface 115. This processing can include operating a standard control interface that may be, for example, TWAIN or ISIS to query the content acquisition device 170 for an embedded serial number, manufactures identification number or other unique identity associated with the device 170 that the device then returns to computer system 110 over the communications interface 115.

As noted above, configurations disclosed herein can provide a combination of both receiving user input for the device identity 195 as well as automatically obtaining an additional portion of information to be used in combination with the user input as a device identity 195 in an automated manner using the communications interface 115. In yet another configuration, the device identity 195 might be embedded within the computer system 110 itself (e.g., in firmware) in which case this alternative configuration would not need to interact with the user 108 or the communications interface 115 in order to ascertain the device identity 195 to be associated with the data acquisition device 170 for which the original content 190 was acquired.

Figure 5:
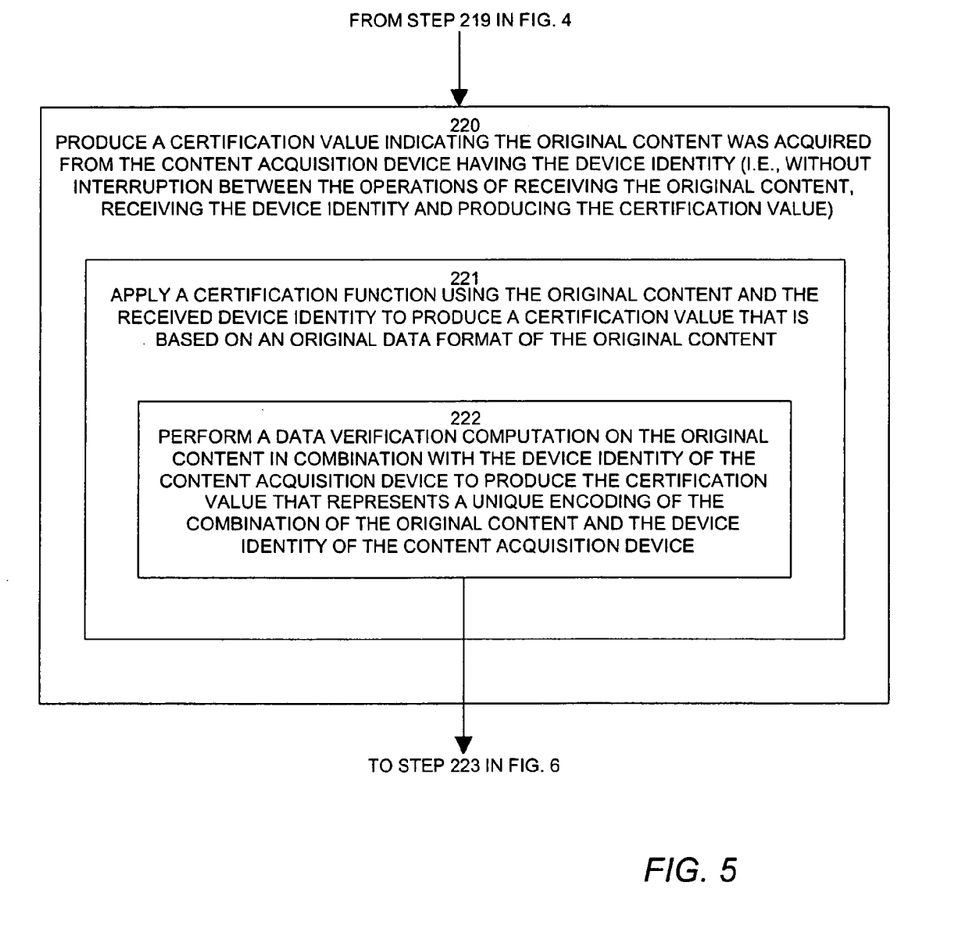

After the processing of step 219 is complete, the processing of the flowchart in FIG. 4 continues at step 220 at the top of the flowchart in FIG. 5.

FIG. 5 is a continuation of the flowchart of processing steps in FIG. 4 and shows further details of processing operations of configuration disclosed herein.

In step 220, the content certifier 150 (e.g., certifier 156) produces a certification value 182 indicating the original content 190 was acquired from the content acquisition device 170 having the device identity 195. Since these processing operations are contemporaneous with each other and happen in a continual uninterrupted processing sequence, the original content 190 is far less susceptible to being tempered with after being acquired but prior to the creation of the certification value 182. Sub-steps 221 and 222 illustrate details of this processing in accordance with one example configuration.

In step 221, the content certifier 150 applies a certification function using the original content 190 and the received device identity 195 to produce a certification value 182 that is based on an original data format of the original content 190.

In sub-step 222, the content certifier 150 performs a data verification computation, such as any type of digital signature function, hashing algorithm, cryptographic operation, checksum calculation or other data processing function on the original content 190 in combination with the device identity 195 of the content acquisition device 170 to produce the certification value 182 that represents a unique encoding of the combination of the original content 190 and the device identity 195 of the content acquisition device 170 from which the original content 190 was acquired.

It is to be understood that it is not necessary to use the device identity 195 as part of the actual signature or signing certificate applied to the original content 190. Instead, in one configuration, the device identity 195 is included as metadata bundled or otherwise maintained in association with the original document content 190 and a standard digital signature approach is applied to this collective set of data. More specifically, in one example, a digital signature comprising a hash computed over some document content or subset thereof, referred to as a "digest", is then encrypted by a private key of a signing entity, such as the computer system 110 or the manufacturer of the device 170. In this configuration, the device identity 195 is included within the digest as metadata and then is encrypted with the device or computer system manufacturer's private key. In such a configuration, a private key can be allocated, for example, for each device, or for each manufacturer. In this manner, certification can be used to verify, for example, that a specific manufacturer's device 170 created (i.e., acquired) specific original document content 190. Thus step 222 includes configurations in which the device identity 195 is used with the signature process as part of the signing certificate, and also includes alternate configurations in which the device identity is instead part of metadata associated with the original content 190 (e.g., in a file) and the content certifier 150 secures the whole package (e.g., original content 190 and associated device identity 195 in the single file) with electronic signature techniques.

The certification value 182 thus represents, in one example configuration, the signature or other mathematical computation that is unique to the original content 190. Accordingly, after creation of a certification value 182, if modifications are made to the original content 190, a recipient of the certified content 180 can use the embedded certification value 182 with a corresponding data verification computation to identify if changes have been made to the original content 190. If the certification value 182 is maintained or inseparably bundled with the original content 190 (as certified content 180 as disclosed herein), an unintended or malicious modification of the original content within the certified content document 180 can easily be detected. Moreover, due to the uniqueness of the data verification computation of the certification value 182, such as application of a digital signature that digitally signs the combined original content 190 along with the device identity 195, it would be extremely difficult if not impossible for a malicious intruder to modify the original content within the certified document content 180 content and to re-create a new valid certification value 182. Likewise, the device identity 195 of the device 170 that acquired the content can be verified or certified in a similar manner. Accordingly, once the certification process 150 produces the certified content 180, a receiving process can validate the certified content and device identity to ensure that it has not been changed. Additionally, the device 170 and/or computer system 110 used to originally acquire the content can be readily identified.

Figure 6:
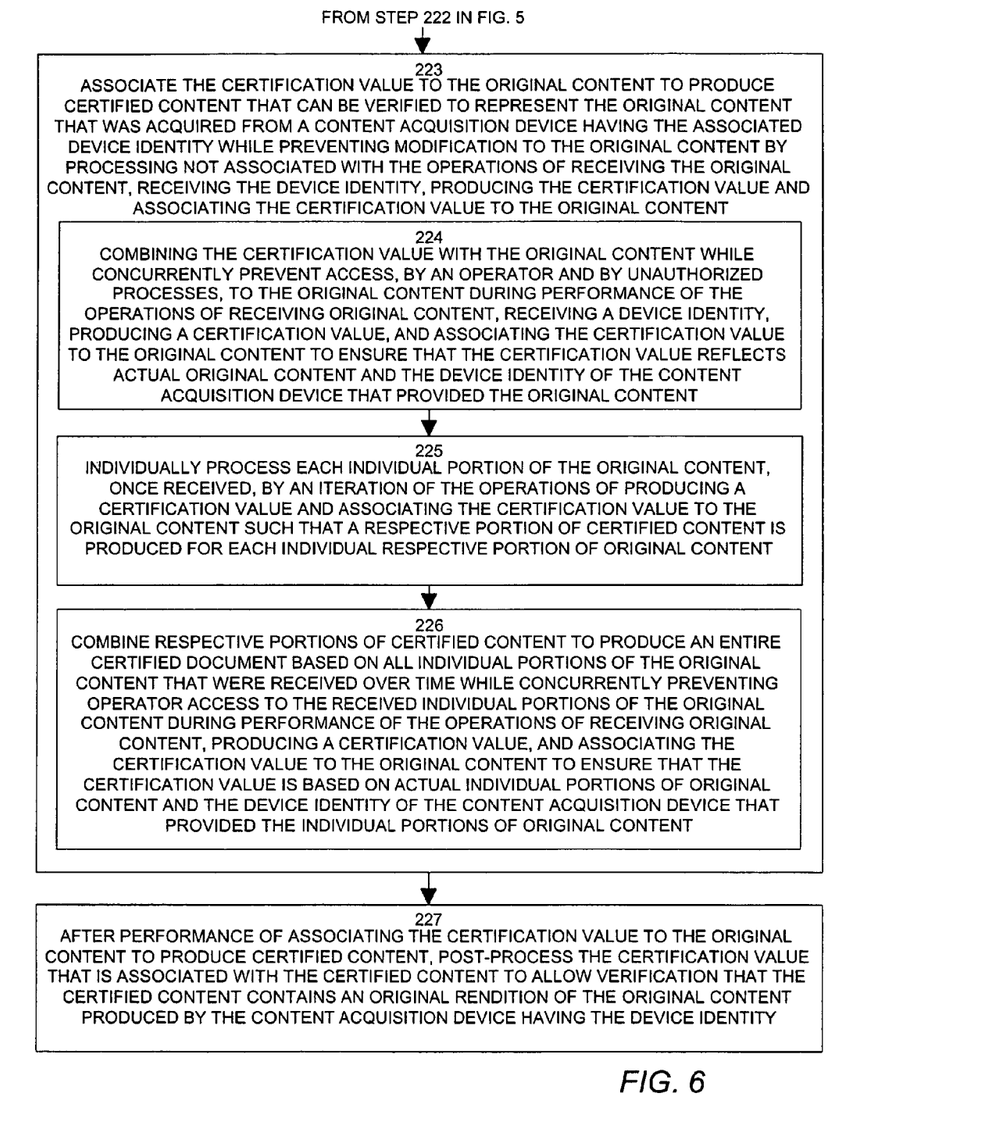

FIG. 6 continues the flowchart of processing steps from step 222 in FIG. 5 and shows further details of configuration disclosed herein.

In step 223, the content certifier 150 associates the certification value 182 to the original content 190 to produce certified content 180 that can be verified to represent the original content 190 that was acquired from a content acquisition device 170 having the associated device identity 195 (also identifiable within the certified content 180) while preventing modification to the original content by processing not associated with the operations of receiving the original content, receiving the device identity, producing the certification value and associating the certification value to the original content. Sub-steps 224 through 226 illustrate details of this processing according to example configurations disclosed herein.

In step 224, the content certifier 150 combines the certification value with the original content while concurrently preventing access, by an operator 108 process and/or by any unauthorized processes (e.g., processes that are not part of the content acquisition application or processes 140 or 150), to the original content 190 during performance of the operations of receiving original content, receiving a device identity, producing a certification value, and associating the certification value to the original content to ensure that the certification value reflects both the actual original content 190 and the device identity 195 of the content acquisition device 170 that actually acquired and provided the original content 190.

Sub-steps 225 and 226 illustrate processing associated with an alternative embodiment in which the operation of acquiring the original content 190 acquires the original content 190 in incremental portions, such as in scanned rows of pixels that are each separately returned to the computer system 110. In this configuration, the content certifier 150 produces a certification value associated with each of those incremental portions. This can be done, for example, to avoid having to collectively store the incremental portions received of the original content 190 for prolonged periods (e.g., during a long scanning process in a file) during which time those incremental portions may be with maliciously tempered with by a malicious operator or process.

In step 225, for each individual received portion of the original content 190, the content certifier 150 respectively processes an iteration of the operations of producing a certification value 182 and associating the certification value 182 to the original content (i.e., to that portion) such that a respective portion of certified content 180 is produced for each individual respective portion of original content 190.

In step 226, the content certifier 150 combines respective portions of certified content to produce the entire certified content 180 based on all individual portions of the original content 190 that were received over time. This is done while concurrently preventing operator access to the received individual portions of the original content during performance of the operations of receiving original content, producing a certification value, and associating the certification value to the original content. This ensures that each separate certification value 182 is based on actual individual portions of original content 190 and the device identity 195 of the content acquisition device 170 that provided the individual portions of original content 190.

It is to be understood that alternative configurations of such processing are contemplated as well. As an example, in one alternative configuration, the content certifier 150 can obtain individual portions of original content 190 in incremental amounts and the collective set of those individual portions, once all have been received, represent the entire original content 190. For each individual received portion of original content 190, the content certifier 150 can produce a respective certification value 182. For example, the individual certification values 182 might be checksums of respective individually received portions of original content 190. Upon completion of receipt of the last portion of original content 190, the content certifier 150 could perform a function to combine the collective plurality of certification values 182 to produce a single certification value 182 that is representative of a certification value associated with the entire amount of received original content 190. Using the checksum example, certifier 150 can combine the checksums to produce a single checksum on the entire sum of individual portions of original content 190. This checksum is unique to the total sum of original content 190. The checksum 182 and all of the original content 190 can then be combine using encryption and/or a digital signature process as the data verification function to bundle this information together in a package of certified content. Once combine in this manner, a recipient of this certified content 180 can unbundled the certified content 180 (e.g., decrypt and validate the signature) to ensure that the original content 190 is accurately represented in the certified content 190.

This is post-processing validation operation (e.g., unbundling and checking of the validity of the certified content 180) can be done at any time after creation of the certified content 180, and can be done by any process equipped with this capability, to allow that process to validate or "certify" the contents of the certified content 180 to ensure that it has not been changed from its original form and/or to ascertain the identity of the device, computer system, and/or user that created this certified content from its original form 190. Generally, this processing is illustrated in step 227.

In step 227, after performance of associating the certification value to the original content to produce certified content 180, any process that requires validation or certification of the certified content 180 can post-process the certification value 182 that is associated with the certified content 180 to allow verification that the certified content contains an original rendition of the original content 190 produced by the content acquisition device 170 having the device identity 195 (also specified in the certified content 180). This can be done in the same or in a different computer system 110. Thus the certified content 180, once created as explained above, can be transferred (e.g., via a network or other means) and can be remotely certified to identify which device created the certified content 180 from original content 190.

In other configurations, an administrator or user 108 who creates the certified content 108 can set permissions on whether the document can be modified or not, or if only certain portions can be modified. Even if modification is allowed, the recipient of certified content 108 is always able to see what the original content 190 was that came out of the content acquisition device 170. In one implementation, the content certifier can be embedded in a data acquisition software application 140 such as Adobe Acrobat that includes a PDF "ScanLibrary" which is an Adobe developed library that creates a PDF file from a raster or TIFF file delivered from a scanner or other data acquisition device 170. The PDF ScanLibrary that embodies the functionality explained herein can apply segmented compression to the original content 190. Thus, configurations explained herein avoid the insecure link from the point the document or other content comes out of the scanner or other device 170 to the point the user 108 manually secures the document (such manual operation being required in conventional systems).

In another example configuration that uses a scanner device 170, the scanning application 140 controlling the scanner 170 is augmented with a user interface that allows a user or administrator 108 to invoke the scanned document certification function which handles both scanning an scanned content certification as explained above. During scanning, once the scan raster 190 is fed into the PDF ScanLibrary, the PDF ScanLibrary reads a unique scanner ID 195 (e.g., Scanner XXX with Serial Number YYY) from the scanner 170 and uses that as the signature for certifying the resultant PDF document 180. This can be implemented in one configuration so that the certification process could not be reversed (e.g., not requiring a password). Thereafter, upon viewing the certified document 180 in a PDF Reader or in Acrobat, the certified PDF file 180 would show that it was certified as being the original scanned file, scanned by Scanner XXX with Serial Number YYY. In one configuration, the content certifier 150 provides an interface so that the operator 108 can input additional metadata such as the physical scanner location (e.g., room number), organization owning the scanner, user name, computer name, etc. This can be included in the device identity that is used when producing the certified content 180. Some or all of this additional information, such as a computer identity of the computer system 110 (e.g., hostname or IP address) can be included as well.

While configurations of the system and method have been particularly shown and described with references to configurations thereof, it will be understood by those skilled in the art that various changes in form and details may be made therein without departing from the scope of the invention. Accordingly, the present invention is not intended to be limited by the example configurations provided above.

What is claimed is:

1. A method for producing certified content, the method comprising: receiving original content acquired from a content acquisition device;
    receiving a device identity associated with the content acquisition device;
    producing a certification value indicating the original content was acquired from the content acquisition device having the device identity;
    associating the certification value to the original content to produce certified content that can be verified to represent the original content that was acquired from the content acquisition device having the associated device identity while preventing modification to the original content by processing not associated with the operations of receiving the original content, receiving the device identity, producing the certification value and associating the certification value to the original content;
    wherein receiving original content acquired from the content acquisition device comprises:
    receiving individual portions of the original content over time, each individual portion being smaller than a sum total of the original content; and
    wherein each individual portion of the original content, once received, is respectively individually processed by an iteration of the operations of producing a certification value and associating the certification value to the original content such that a respective portion of certified content is produced for each individual respective portion of original content;
    wherein receiving portions of the original content over time includes incrementally acquiring scanned rows of pixels from a physical source, wherein the scanned rows of pixels are each separately returned for receiving the certification value; and
    combining respective portions of certified content to produce an entire certified document based on all individual portions of the original content that were received over time while concurrently preventing operator access to the received individual portions of the original content during performance of the operations of receiving original content, producing a certification value, and associating the certification value to the original content to ensure that the certification value is based on actual individual portions of original content and the device identity of the content acquisition device that provided the individual portions of original content.

2. The method of claim 1 wherein receiving original content acquired from a content acquisition device comprises:
    receiving a document certification request indicating that an operator desires to acquire and certify content obtained by the content acquisition device;
    in response to the document certification request, operating a communications interface to the content acquisition device to cause the content acquisition device to obtain the original content and transmit the original content for receipt; and
    in response to operating the communications interface, receiving the original content over the communications interface while contemporaneously preventing operator access to the original content during performance of the operations of receiving original content, receiving a device identity, producing a certification value, and associating the certification value to the original content.

3. The method of claim 1 wherein producing a certification value for the original content comprises:
    applying a certification function using the original content and the received device identity to produce a certification value that is based on an original data format of the original content; and
    wherein associating the certification value to the original content comprises:
    combining the certification value with the original content while concurrently preventing access, by an operator and by unauthorized processes, to the original content during performance of the operations of receiving original content, receiving a device identity, producing a certification value, and associating the certification value to the original content to ensure that the certification value reflects actual original content and the device identity of the content acquisition device that provided the original content.

4. The method of claim 3 wherein receiving a device identity associated with the content acquisition device comprises:
    prompting for a component of the device identity associated with the content acquisition device; and
    receiving the component of the device identity to be associated with the content acquisition device;
    receiving a remaining component of the device identity from a storage location not modifiable.

5. The method of claim 3 wherein receiving a device identity associated with the content acquisition device occurs contemporaneously with receiving original content and comprises:
    operating the communication interface to obtain the device identity maintained within the content acquisition device; and
    receiving the device identity associated with the content acquisition device over the communications interface.

6. The method of claim 5 wherein operating the communication interface to obtain the device identity maintained within the content acquisition device comprises:
    obtaining the device identity from the content acquisition device at the same time as obtaining the original content from the content acquisition device, the device identity being encoded within a data format of the original content that is received over the communications interface.

7. The method of claim 5 wherein the content acquisition device is a scanner device coupled to a computer system, the scanner device capable of scanning the original content and returning the original content to the computer system, the computer system performing the operations of operations of receiving original content from the scanner device, receiving a device identity from the scanner device, producing a certification value, and associating the certification value to the original content received from the scanner device while concurrently preventing access, by an operator of the content acquisition device and by an operator of the computer system and by unauthorized processes executing on the computer system, to the original content within the computer system from the time the original content was received from the scanner device until the original content is converted to certified content.

8. The method of claim 7 comprising:
within the computer system, post-processing the certification value that is associated with the certified content using a data verification computation that corresponds to a data verification computation applied during the operation of producing a certification value to allow verification that the certified content contains an original rendition of the original content produced by the content acquisition device having the device identity.

9. The method of claim 1 wherein producing a certification value for the original content comprises:
applying a certification function using the original content and the received device identity to produce a certification value that is based on an original data format of the original content combined with the received device identity; and
wherein associating the certification value to the original content comprises:
combining the certification value with the original content while concurrently preventing operator access to the original content during performance of the operations of receiving original content, receiving a device identity, producing a certification value, and associating the certification value to the original content to ensure that the certification value reflects actual original content and the device identity of the content acquisition device that provided the original content.

10. The method of claim 9 wherein applying a certification function using the original content and the received device identity comprises:
performing a data verification computation on the original content in combination with the device identity of the content acquisition device to produce the certification value that represents a unique encoding of the combination of the original content and the device identity of the content acquisition device; and
after performance of associating the certification value to the original content to produce certified content, post-processing the certification value that is associated with the certified content to allow verification that the certified content contains an original rendition of the original content produced by the content acquisition device having the device identity.

11. The method of claim 1, wherein receiving original content acquired from the content acquisition device includes: scanning a physical source of original content using a scanner device peripherally connected to a computer system.

12. The method of claim 11, wherein scanning the physical source of original content includes scanning a paper document;
wherein receiving original content acquired from the content acquisition device includes creating a portable document format (PDF) file from a raster file delivered from the scanner device; and wherein preventing modification to the original content includes preventing modification to the raster file or PDF file before associating the certification value to the original content.

13. The method of claim 1, wherein receiving original content acquired from a content acquisition device includes taking a digital photograph using a digital camera device.

14. The method of claim 13, further comprising maintaining the original content to be certified in a protected memory location of the digital camera, wherein an operator of the camera is not permitted access to the acquired content which is being certified from a time the digital camera acquires the original content to a time that the original content is certified with the device identity.

15. The method of claim 5, wherein the processing operations associated with producing a certification value for the original content are implemented within a certification processor that executes within a scanner device or a digital camera device.

16. A computer system comprising:
a memory;
a processor;
a communications interface coupled to a content acquisition device;
an interconnection mechanism coupling the memory, the processor and the communications interface allowing communication there between;
wherein the memory is encoded with a content certifier application, that when executed in the processor, provides a content certifier process that produces certified content by causing the computer system to perform the operations of:
receiving original content acquired from a content acquisition device; receiving a device identity associated with the content acquisition device;
producing a certification value indicating the original content was acquired from the content acquisition device having the device identity;
associating the certification value to the original content to produce certified content that can be verified to represent the original content that was acquired from the content acquisition device having the associated device identity while preventing modification to the original content by processing not associated with the operations of receiving the original content, receiving the device identity, producing the certification value and associating the certification value to the original content;
wherein receiving original content acquired from the content acquisition device comprises:
receiving individual portions of the original content over time, each individual portion being smaller than a sum total of the original content; and
wherein each individual portion of the original content, once received, is respectively individually processed by an iteration of the operations of producing a certification value and associating the certification value to the original content such that a respective portion of certified content is produced for each individual respective portion of original content; wherein receiving portions of the original content over time includes
incremental acquiring scanned rows of pixels from a physical source, wherein the scanned rows of pixels are each separately returned for receiving the certification value; and
combining respective portions of certified content to produce an entire certified document based on all individual portions of the original content that were received over time while concurrently preventing operator access to the received individual portions of the original content during performance of the operations of receiving original content, producing a certification value, and associating the certification value to the original content to ensure that the certification value is based on actual individual portions of original content and the device identity of the content acquisition device that provided the individual portions of original content.

17. The computer system of claim 16 wherein when the content certifier process causes the computer system to perform the operation of receiving original content acquired from a content acquisition device, the content certifier process causes the computer system to perform the operations of:
receiving a document certification request indicating that an operator desires to acquire and certification content obtained by the content acquisition device;
in response to the document certification request, operating a communications interface to the content acquisition device to cause the content acquisition device to obtain the original content and transmit the original content for receipt; and
in response to operating the communications interface, receiving the original content over the communications interface while contemporaneously preventing operator access to the original content during performance of the operations of receiving original content, receiving a device identity, producing a certification value, and associating the certification value to the original content.

18. The computer system of claim 16 wherein when the content certifier process causes the computer system to perform the operation of producing a certification value for the original content, the content certifier process causes the computer system to perform the operations of:
applying a certification function using the original content and the received device identity to produce a certification value that is based on an original data format of the original content; and
wherein when the content certifier process causes the computer system to perform the operation of associating the certification value to the original content, the content certifier process causes the computer system to perform the operation of:
combining the certification value with the original content while concurrently preventing access, by an operator and by unauthorized processes, to the original content during performance of the operations of receiving original content, receiving a device identity, producing a certification value, and associating the certification value to the original content to ensure that the certification value reflects actual original content and the device identity of the content acquisition device that provided the original content.

19. The computer system of claim 18 wherein when the content certifier process causes the computer system to perform the operation of receiving a device identity associated with the content acquisition device, the content certifier process causes the computer system to perform the operations of:
prompting for a device identity associated with the content acquisition device; and
receiving the device identity to be associated with the content acquisition device.

20. The computer system of claim 18 wherein receiving a device identity associated with the content acquisition device occurs contemporaneously with receiving original content and the content certifier process causes the computer system to perform the operations of:
operating the communication interface to obtain the device identity maintained within the content acquisition device; and
receiving the device identity associated with the content acquisition device over the communications interface.

21. The computer system of claim 20 wherein when the content certifier process causes the computer system to perform the operation of operating the communication interface to obtain the device identity maintained within the content acquisition device, the content certifier process causes the computer system to perform the operation of:
obtaining the device identity from the content acquisition device at the same time as obtaining the original content from the content acquisition device, the device identity being encoded within a data format of the original content that is received over the communications interface.

22. The computer system of claim 20 wherein the content acquisition device is a scanner device coupled to a computer system, the scanner device capable of scanning the original content and returning the original content to the computer system, and wherein the computer system performs the operations of operations of receiving original content from the scanner device, receiving a device identity from the scanner device, producing a certification value, and associating the certification value to the original content received from the scanner device while concurrently preventing access, by an operator of the content acquisition device and by an operator of the computer system and by unauthorized processes executing on the computer system, to the original content within the computer system from the time the original content was received from the scanner device until the original content is converted to certified content.

23. The computer system of claim 22 wherein the content certifier process causes the computer system to perform the operation of:
post-processing the certification value that is associated with the certified content using a data verification computation that corresponds to a data verification computation applied during the operation of producing a certification value to allow verification that the certified content contains an original rendition of the original content produced by the content acquisition device having the device identity.

24. The computer system of claim 16 wherein when the content certifier process causes the computer system to perform the operation of producing a certification value for the original content, the content certifier process causes the computer system to perform the operation of:
applying a certification function using the original content and the received device identity to produce a certification value that is based on an original data format of the original content combined with the received device identity;
and wherein when the content certifier process causes the computer system to perform the operation of associating the certification value to the original content, the content certifier process causes the computer system to perform the operation of:
combining the certification value with the original content while concurrently preventing operator access to the original content during performance of the operations of receiving original content, receiving a device identity, producing a certification value, and associating the certification value to the original content to ensure that the certification value reflects actual original content and the device identity of the content acquisition device that provided the original content.

25. The computer system of claim 24 wherein when the content certifier process causes the computer system to perform the operation of applying a certification function using the original content and the received device identity, the content certifier process causes the computer system to perform the operations of:
 performing a data verification computation on the original content in combination with the device identity of the content acquisition device to produce the certification value that represents a unique encoding of the combination of the original content and the device identity of the content acquisition device; and
 after performance of associating the certification value to the original content to produce certified content, post-processing the certification value that is associated with the certified content to allow verification that the certified content contains an original rendition of the original content produced by the content acquisition device having the device identity.

26. A computer readable storage medium including computer program logic encoded thereon that, when executed on a computer system, causes the computer system to produce certified content by performing the operations of:
 receiving original content acquired from a content acquisition device;
 receiving a device identity associated with the content acquisition device;
 producing a certification value indicating the original content was acquired from the content acquisition device having the device identity;
 associating the certification value to the original content to produce certified content that can be verified to represent the original content that was acquired from the content acquisition device having the associated device identity while preventing modification to the original content by processing not associated with the operations of receiving the original content, receiving the device identity, producing the certification value and associating the certification value to the original content;
 wherein receiving original content acquired from the content acquisition device comprises:
 receiving individual portions of the original final content over time, each individual portion being smaller than a sum total of the original content; and
 wherein each individual portion of the original content, once received, is respectively individually processed by an iteration of the operations of producing a certification value and associating the certification value to the original content such that a respective portion of certified content is produced for each individual respective portion of original content; wherein receiving portions of the original content over time includes
incrementally acquiring scanned rows of pixels from a physical source, wherein the scanned rows of pixels are each separately returned for receiving the certification value; and
 combining respective portions of certified content to produce an entire certified document based on all individual portions of the original content that were received over time while concurrently preventing operator access to the received individual portions of the original content during performance of the operations of receiving original content, producing a certification value, and
associating the certification value to the original content to ensure that the certification value is based on actual individual portions of original content and the device identity of the content acquisition device that provided the individual portions of original content.

27. A computer system comprising: a memory; a processor; a communications interface coupled to a content acquisition device; an interconnection mechanism coupling the memory, the processor and the communications interface allowing communication there between;
 wherein the memory is encoded with a content certifier application, the when executed in the processor, provides a means for producing certified content, the means including:
 means for receiving original content acquired from a content acquisition device;
 means for receiving a device identity associated with the content acquisition device;
 means for producing a certification value indicating the original content was acquired from the content acquisition device having the device identity;
 means for associating the certification value to the original content to produce certified content that can be verified to represent the original content that was acquired from the content acquisition device having the associated device identity while preventing modification to the original content by processing not associated with the operations of receiving the original content, receiving the device identity, producing the certification value and associating the certification value to the original content;
 wherein receiving individual content acquired from the content acquisition device comprises:
 means for receiving individual portions of the original content over time, each individual portion being smaller than a sum total of the original content; and
 wherein each individual portion of the original content once received, is respectively individually processed by an iteration of the operations of producing a certification value and associating the certification value to the original content such that a respective portion of certified content is produced for each individual respective portion of original content; wherein receiving portions of the original content over time includes
 means for incrementally acquiring scanned rows of pixels from physical source, wherein the scanned rows of pixels are each separately returned for receiving the certification value; and
 means for combining respective portions of certified content to produce an entire certified document based on all individual portions of the original content that were received over time while concurrently preventing operator access to the received individual portions of the original content during performance of the operations of receiving original content, producing a certification value, and associating the certification value to the original content to ensure that the certification value is based on actual individual portions of original content and the device identity of the content acquisition device that provided the individual portions of original content.

28. A method for verifying certified content, the method comprising:
 processing a certification value that is associated with the certified content using a data verification computation that corresponds to a data verification computation applied during an operation of producing a certification value on original content acquired from a content acquisition device, processing of the certification value allowing verification that:
 i) the certified content contains an original rendition of the original content that was acquired by the content acquisition device having a device identity specified in the certified content; and ii) the certification value was associated to the original content to produce the certified content while preventing modification to the original content by processing not associated with operations of receiving the original content from the data acquisition device having the device identity, receiving the device identity for the data acquisition device that acquired the original content, producing the certification value and associating the certification value to the original content to produce the certified content;

wherein the original content was acquired from the content acquisition device as individual portions of the original content received over time, each individual portion being smaller than a sum total of the original content;

wherein each individual portion of the original content, once acquired from the content acquisition device was respectively individually processed by an iteration of the operations of producing the certification value and associating the certification value to the original content such that a respective portion of certified content was produced for each individual respective portion of original content;

wherein the certified content was produced for each individual respective portion of original content;

wherein individual portions of the original content received over time includes incrementally acquired scanned rows of pixels from a physical source, wherein the scanned rows of pixels were each separately returned to receive the certification value; and wherein respective portions of certified content were combined to produce an entire certified document based on all individual portions of the original content that were received over time while operator access was concurrently prevented to the received individual portions of the original content during performance of operations that received original content, produced the certification value, and associated the certification value to the original content to ensure that the certification value is based on actual individual portions of original content and the device identity of the content acquisition device that provided the individual portions of original content.

29. The method of claim 28, wherein allowing verification that the certified content contains an original rendition of the original content that was acquired by the content acquisition device having a device identity specified in the certified content includes displaying a portable document format (PDF) file and displaying a scanner device identity and serial number.

\* \* \* \* \*